United States Patent [19]
Shikunami et al.

[11] Patent Number: 6,038,208
[45] Date of Patent: Mar. 14, 2000

[54] INFORMATION RECORDING DISC RECORDED WITH SIGNALS AT TWO DIFFERENT RECORDING DENSITIES

[75] Inventors: Juichi Shikunami, Miura-gun; Akira Nishizawa; Makoto Itonaga, both of Yokohama, all of Japan

[73] Assignee: Victor Company of Japan, Ltd., Yokohama, Japan

[21] Appl. No.: 08/930,344

[22] PCT Filed: Mar. 28, 1996

[86] PCT No.: PCT/JP96/00830

§ 371 Date: Sep. 30, 1997

§ 102(e) Date: Sep. 30, 1997

[87] PCT Pub. No.: WO96/30906

PCT Pub. Date: Mar. 10, 1996

[30] Foreign Application Priority Data

| Mar. 30, 1995 | [JP] | Japan | 7-100540 |
| Mar. 31, 1995 | [JP] | Japan | 7-100220 |
| Nov. 22, 1995 | [JP] | Japan | 7-328346 |
| Nov. 29, 1995 | [JP] | Japan | 7-333980 |

[51] Int. Cl.$^7$ .................................................... G11B 7/24
[52] U.S. Cl. ................................. 369/275.3; 369/275.4
[58] Field of Search ........................... 369/275.3, 275.4, 369/275.1, 13, 277, 32, 48, 54, 58, 275.2, 111, 124, 44.26; 360/66, 48, 39

[56] References Cited

U.S. PATENT DOCUMENTS

| 4,298,897 | 11/1981 | Arter et al. | 360/39 |
| 4,901,169 | 2/1990 | Hamaeka et al. | 360/66 |
| 5,153,866 | 10/1992 | Satoh et al. | 369/54 |
| 5,796,711 | 8/1998 | Tomita et al. | 369/275.4 |

FOREIGN PATENT DOCUMENTS

| 52-135613 | 11/1977 | Japan . |
| 57-046364 | 3/1982 | Japan . |
| 1-042028 | 2/1989 | Japan . |
| 1-223669 | 9/1989 | Japan . |
| 2-101678 | 4/1990 | Japan . |
| 2223030 | 5/1990 | Japan . |
| 2-193317 | 7/1990 | Japan . |
| 3-017867 | 1/1991 | Japan . |
| 3-079790 | 4/1991 | Japan . |
| 3-183091 | 8/1991 | Japan . |
| 5-250811 | 9/1993 | Japan . |
| 6-036521 | 2/1994 | Japan . |
| 6-168449 | 6/1994 | Japan . |
| 6-274940 | 9/1994 | Japan . |

OTHER PUBLICATIONS

Nikkei Electronics, No. 630, Feb. 27, 1995 (Tokyo), Masaharu Takano, Mamoru Harada, "Digital Video Disc Japan's Challenge to Multimedia Age", pp. 87–100, partic. refer to Fig. 3 of p. 99.

AES–Preprint No–1549, p. 12.

Primary Examiner—Ali Neyzari
Attorney, Agent, or Firm—Jacobson, Price, Holman & Stern, PLLC

[57] ABSTRACT

An information recording medium provides a first signal recording area (A) on which a first data is recorded, and a second signal recording area (B) which is a signal recording area outer from the first area in the radius direction, records a second data at a density higher than that of the first data, and wherein the second data includes the same contents of information as the first data. The recording density of the second data may be 2 to 10 times that of the first data. The sampling rate, the number of quantized bits, and the number of pixels of the second data may be more than the sampling rate, the number of quantized bits, and the number of pixels of the first data, respectively. The first data may be recorded at a fixed transfer rate, and the second data may be recorded at a variable transfer rate. A music signal of an audible band may be recorded for the first data, and a music signal up to an ultrasound band other than an audible band may be recorded for the second data.

11 Claims, 7 Drawing Sheets

INFORMATION RECORDING DISC RECORDED WITH SIGNALS AT TWO DIFFERENT RECORDING DENSITIES

TECHNICAL FIELD

The invention relates to an information recording disc that records video and/or music information.

BACKGROUND ART

The problem conventional techniques and the invention try to solve is explained in the order of the following (1) single board optical disc and (2) two-disc bonded optical disc.

(1) Single Board Optical Disc

A so-called compact disc (CD) is well known as an optical disc that records a music signal by performing 44.1 kHz sampling and 16-bit quantization for a music signal audible band.

On the contrary, for an application in studios and so on, a music signal is recorded as a sampling frequency of 88.2 to 96 kHz and the number of quantized bits of 20 to 24 for up to an ultrasound band (approximately 20 to 50 kHz band) exceeding the music signal audible band. However, an expensive application apparatus is required for this recording and reproduction.

The art rejecting unimportant audible parts of sampling and quantized data for a music signal audible band, compressing irreversibly an original data with one kind of compression algorithm, and recording and reproducing on a recording medium the constant amount of information per apparatus time of music play time, is known.

The art compressing irreversibly an original data by using a video space correlation, using time correlation, and rejecting unnecessary visual data in relation to data of video signal sampling and amplitude quantization, is also known.

To compress irreversibly data like this, there are methods for making the amount of video information per apparatus time constant, and for changing the amount of video information per apparatus time depending on the video condition; both arts are known.

In addition, the art recording and reproducing irreversibly compressed data on an optical disc using the former method that makes the amount of video information per apparatus time constant, is known. Further, the art recording and reproducing on an optical disc irreversibly compressed data wherein the amount of information per apparatus time of video play time is changed depending on a video condition using the latter method for changing the amount of video information per apparatus time depending on a video condition, especially the art reproducing with buffer memory, pickup kick wait (regenerating wait operation), and search function, are known. To store a large amount of data efficiently, a hard disc drive (HDD) for use with a computer may record the data by compressing reversibly, with a naming such as so-called lossless compression and so on, and at reading, expand complementarily the data to be regenerated; this art is known.

Furthermore, the main art of a high-density optical disc recording video and/or music information at a density 3 to 8 times higher than that of a CD for general consumers, is known.

The art wherein a first area that is the inner side of an optical disc is a CD voice signal recording area, and a second area that is the outer side of the first area is a video signal recording area for recording at a high density a analog FM modulated video signal, is called CD-V (CD-VIDEO) and known.

Still, the disc wherein the first area that is the inner side of a high-density recording disc has CD recording density (low-recording density), and the second area of its outer side has high-recording density, is, for example, described in Japanese Patent Laid-Open No. 168449/1994 and known. A system is designed such that, against a low-density disc reading laser wavelength (780 nm), a high-density disc is read with a short wavelength laser (635 nm). At this time, the pit depth of a disc is determined in relation to 0.25 times reading laser wavelength. In other words, it is suitable to make the pit depth of high-density disc shorter than that of a low-density disc.

Also, even if the pit depth is not defined as a standard, it is common that a reproducing signal characteristic with a standardized normal optical pickup is defined with a range; and the pit depth is defined equivalently with a range. Further, in general, the mechanical accuracy is reduced for a low-density disc, and is strictly defined for a high-density disc.

In relation to music signal recording and reproduction to an optical disc, improvements in a voice signal frequency band (i.e. in a sampling frequency) and in its amplitude axis accuracy (i.e. in the number of quantized bits), are required.

High-density digital data that is a music signal having a sampling frequency of 88 to 96 kHz, and the number of quantized bits of 20 to 24 for up to an ultrasound band (approximately 20 to 50 kHz band) exceeding a music signal audible band, has the amount of data per apparatus time 2.5 to 3.3 times larger than that of a basic digital data locating 44.1 kHz sampling and 16-bit quantization.

When this high-density digital data is recorded and reproduced on an optical disc like a CD, it is necessary to offer 2.5- to 3.3-times improvement in storage capacity per optical disc, in order to equalize play time per optical disc with that of a CD. The contents of the main art of a reproducing apparatus reproducing a high-density optical disc on which this high-density digital data is recorded, is known as described above.

However, such high-density optical disc cannot be reproduced with a conventionally available reproducing apparatus (e.g. CD player). For this reason, music publishers must publish two kinds of the same music program source for a CD and a high-density optical disc, i.e. perform double inventory.

Also, means for concretely solving this double inventory to make single inventory, has not been disclosed.

(2) Two-disc Bonded Optical Disc

A multilayer optical disc having a plurality of recording layers by bonding together two optically transparent substrates on which a convex and recessed shape information pit and reflective layer are formed, in order to increase the recording space of an optical disc so as to read optically information formed on a helical (spiral or concentric) information track, is disclosed in Japanese Patent Laid-Open No. 223030/1990 and Japanese Patent No. 27815/1986. One example of a multilayer optical disc disclosed in these is shown in FIG. 13.

FIG. 13 is a cross-sectional view showing one example of a conventional multilayer optical disc, and is a diagram taken along a cutting surface through the center of an optical disc. The horizontal direction in the same diagram shows a radius direction of the optical disc; and the vertical direction shows a thickness direction of the optical disc.

In an optical disc 50 of FIG. 13, a first recording layer 52 on which information is recorded by a convex and recessed shape information pit is provided on a disc substrate (optically transparent first substrate) 51; and a first reflective layer 53 is provided on the first recording layer 52. Likewise, a second recording layer 56 on which information is recorded by a convex and recessed shape information pit is provided on a disc substrate (optically transparent second substrate) 55; and a second reflective layer 57 is provided on the second recording layer 56.

Each recording layer side of the first substrate 51 and the second substrate 55, is bonded through a bonding layer 54.

The optical disc 50 has a thin disc substrate for high-density recording, reducing various optical aberrations due to disc substrate thickness.

For example, in order that storage space per recording layer is 4 times the 1.2 mm disc substrate thickness of a conventional CD, the first substrate 51 and the second substrate 55 have approximately 0.6 mm thickness, respectively, and then the two disc substrates are bonded together to have recording space 8 times that of a CD.

As shown in FIG. 13, the first recording layer 52 is formed on the first substrate 51 and is provided in proximity to the bonding layer 54, while the second recording layer 56 is formed on the second substrate 55 and is provided near the bonding layer 54. In other words, two recording layers are provided in proximity to the thickness direction center of the optical disc 50.

The reflective rate of the first reflective layer 53 is a low reflective rate (e.g. 30%), while that of the second reflective layer 57 is a high reflective rate (e.g. 95%). A reproducing laser light is irradiated from the first substrate 51 side as shown in FIG. 13, and is gathered on the first recording layer 52 or the second recording 56 to read information of each recording layer.

Such reproducing apparatus reproducing a high-density optical disc can naturally reproduce the information on the first recording layer 52 on the second recording layer 56, recorded at a high density; and can generally regenerate a low recording density optical disc like a CD.

To reproduce both of a high-density and low-density optical discs, the reading optical head in a high-density optical disc reproducing apparatus has separately the optical system of a high-density disc optical disc and that of a low-density optical disc, or adopts a two-focus hologram-applied optical system; therefore, according to each optical disc, the size of a laser light spot is optimized, and the difference in the disc substrate thickness is corrected.

However, there is a problem that a high-density optical disc cannot be reproduced by a conventional low-density optical disc reproducing apparatus.

In a low-density optical disc reproducing apparatus, this is caused by a too large diameter of a laser light spot gathered on the recording layer, and the great difference in thickness between a high-density and low-density disc substrates.

Ideally, it is desirable that a low-density area A and a high-density area B coexisting on one information recording disc, meet standard A based on that the entire disc surface is low-density area A, and standard B based on that the entire disc surface is high-density area B, respectively.

In a disc producing method for recording a phase pit for mass replicate, the thickness of the photosensitive agent on an unexposed original disc prepared before recording, determines a pit depth. It is generally difficult to change the thickness of the photosensitive agent on one original disc in a 5% or more step-by-step manner. In a normal method, the thickness of the photosensitive agent on one original disc is uniform. When the low-density area A and the high-density B coexist on one disc, there is a problem of which one the pit depth is produced for. The example that the digital signals of the low-density area A and the high-density area B coexist on one disc, is described in Japanese Patent Laid-Open No. 168449/1994 mentioned above, but a means for solving the above problems and this problem has not been covered at all.

For the problem of when the low-density area A and the high-density B coexist on one disc, which one the pit depth (or groove depth) is matched to, the invention combines a method for defining a pit depth in relation to signal output, with a method for defining mechanical and optical accuracies in relation to the disc mechanical accuracy. In the standard A based on that the entire disc surface is low-density A and the standard B based on that the entire disc surface is high-density B, the standard B will generally be determined chronologically in later years. The standard B generally uses a short wavelength laser, having a pit depth shallower than that of the standard A by an approximately short wavelength.

The standard B defined chronologically in later years is for high-density recording in consideration of use of a relatively short wavelength laser and a relatively high aperture lens; and needs more improvement in disc mechanical and optical accuracies than those of the standard A. Considering these requirements and press technology improvement, the disc mechanical and optical accuracies of the standard B are determined to be higher than those of the standard A.

From the above reasons, a low-density and a high-density optical discs on which the same contents of program (information) is recorded, are produced and sold separately, resulting in various inconvenience between manufacturers and users.

This invention is made in consideration of the above problem, and aims to offer an information recording disc having a low-density recording area and high-density recording area with extremely much recording space.

DISCLOSURE OF THE INVENTION

To achieve the above purpose, the information recording disc of the invention provides a first signal recording area on which a first data is recorded, and a second signal recording area that is a signal recording area outside said first area in the radius direction and wherein a second data is recorded at a density higher than that of said first data, and said second data includes the same contents of information as said first data.

Further the information recording disc of the invention provides a first signal recording area on which a first data is recorded, and the second signal recording area that is a signal recording area outside said first area in the radius direction and wherein a second data is recorded at a density higher than that of said first data, and a third area that is a signal recording area inside said first area in said radius direction and wherein an information signal related to said second data is recorded at the same recording density as that of said second data.

Yet the information recording disc of the invention provides a signal recording surface having a first signal recording area and a second signal recording area which is adjacent to said first signal recording area in the radius direction, records a signal at a recording density 2 to 10 times that of said first signal recording area, and has the same signal recording groove depth as that of said first signal recording area, wherein mechanical and optical accuracies determined when recording said signal at the recording density of said second area are applied to the entire of said signal recording surface.

Still the information recording disc of the invention wherein a first substrate and a second substrate on which a regenerating light is irradiated are bonded through a bonding layer, comprising: a first recording area in proximity to said bonding layer and formed on the outer part in the radius direction of said information recording disc to record information, and a second recording area in proximity to the surface of said information recording disc and formed on the inner part of said information recording disc in the radius direction to record information at a density lower than that of said first recording layer.

Furthermore the information recording disc of the invention wherein a first substrate and a second substrate on which a reproducing light is irradiated are bonded through a bonding layer, comprising: a first recording area in proximity to said bonding layer and formed on the outer part in the radius direction of said information recording disc to record information, a second recording area in proximity to said bonding layer and formed on the inner part in said radius direction to record information, and a second recording area in proximity to the surface of said information recording disc and formed between said outer part and inner part to record information at a density lower than that of said first and second recording areas.

BEST EMBODIMENTS OF THE INVENTION (A) The single board structure of the information recording medium of the invention is explained along FIGS. 1 to 8.

Figure 1:
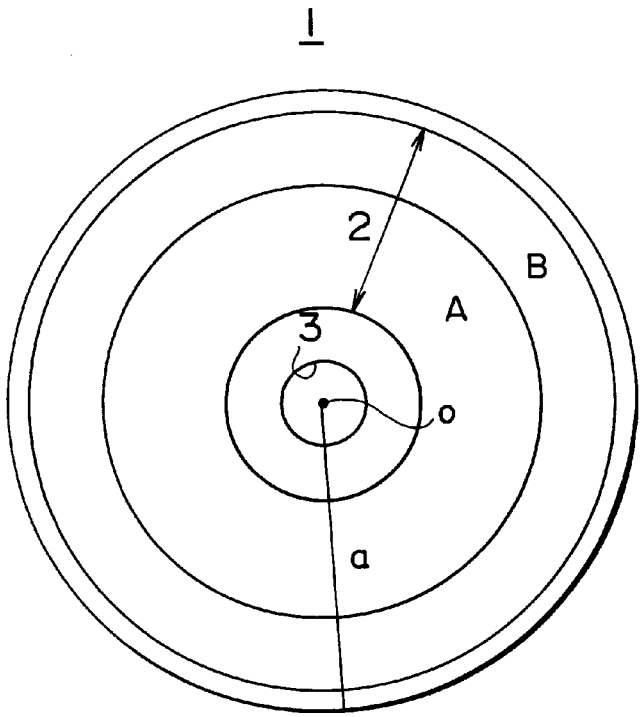
FIG. 1 is an external view of the information recording disc of the invention.

An optical disc 1, an information recording disc of the invention, provides a signal recording surface 2 having a first area A and a second area B segmented in the radius direction, as shown in FIG. 1. Reference numeral 3 is a center hole.

Figure 2:
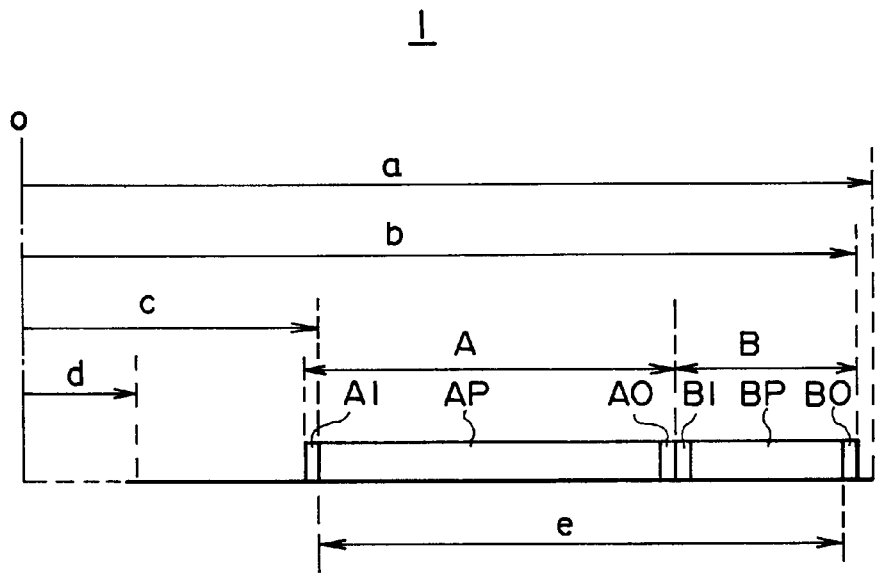
FIG. 2 is a diagram for explaining an information area recorded on the information recording disc in FIG. 1.

As shown in FIG. 2, on the information area recorded in the radius direction of the optical disc 1, "a" is a radius of the optical disc 1; "b" is a radius from the center 0 of the center hole 3 to outermost (readout) part of the signal recording surface 2; "c" is a radius from the center 0 of the center hole 3 to innermost (readin) part of the signal recording surface 2; "d" is a radius of the center hole 3; and "e" is a signal recording area of the signal recording surface 2. The first area A is composed of readin area AI, signal recording area AP, and readout area AO. The second area B is composed of readin area BI, signal recording area BP, and readout area BO.

[First Embodiment]

The first embodiment of the information recording disc of the invention is a 120 mm diameter audio disc. The disc thickness (a distance from a disc surface (protective layer) to a disc signal surface) is 1.2 mm.

The first area A located on the inner side starting reproduction is recorded with a CD format (conforming to JIS S 8605 standard). The readin area AI of 23 to 25 mm radius, included in the first area A, is recorded by the CD format.

It is easy to set a status (set a bit showing the kind of an information recording disc) on this readin area AI so that a newly formatted reproducing apparatus (player) can read existence of the second area B, without affecting a conventional CD player at all. For example, a definition may be assigned to an unused bit of TOC (Table of Contents) recorded with a CD subcode, to set a status in which the second area B exists. After termination of music information recorded on the signal recording area AP, the defined length of a readout track (readout area AO) is recorded on the first area A for termination.

The recording density of music information recorded on the signal recording area BP of the second area B, is favorably 2 to 10 times the recording density of the signal recording area AP. In the embodiment, the recording density is 4.5 times (3.7 GB recording space on the entire signal recording surface 2) that of the signal recording area AP (0.8 GB recording space on the entire signal recording surface 2). Also the music sources recorded on the two signal recording areas AP and BP are completely the same. The music information program recorded on the signal recording area AP of the first area A, is for up to a music signal audible band (to approximately 20 kHz), and becomes data by a CD sampling rate (44.1 kHz sampling frequency) and the number of quantized bits of 16.

On the other hand, the music information program recorded on the signal recording area BP of the second area B, is for up to a music signal ultrasound band above an audible band (to approximately 50 kHz). 88.2 kHz sampling frequency and the number of quantized bits of 20 are relatively higher than the sampling rate and the number of quantized bits used for recording music information on the signal recording area AP.

A newly formatted reproducing apparatus (player) is used for reproduction of the signal recording area BP of the second area B, combining a unit for increasing regenerating time. The music information recorded on the signal recording area BP of the second area B, uses reversibly compressed music information data (entropy coded). In this case, on a basis of progressive time apparatus of the music information, the amount of this music information data changes.

To reproduce this music information data, the newly formatted reproducing apparatus uses buffer memory, pickup kick wait and search functions, and reproducing technology (the basic explanation of this technology is described in Japanese Patent Laid-Open No. 223669/1989.

Reversible compression of sampled and quantized music information data is, for example, described in AES-PREPRINT NO-1549 (document) in November of 1979, in which the example that 30 to 40% of music information data sampled and quantized under a CD condition, can reversibly be compressed is shown. This reversible compression uses DPCM technology with a difference from prior data.

The amount of high-quality music information data of 88.2 kHz sampling and 20-bit quantization, is 2.5 times that of CD music information data of 44.1 kHz sampling and 16-bit quantization.

Figure 3:
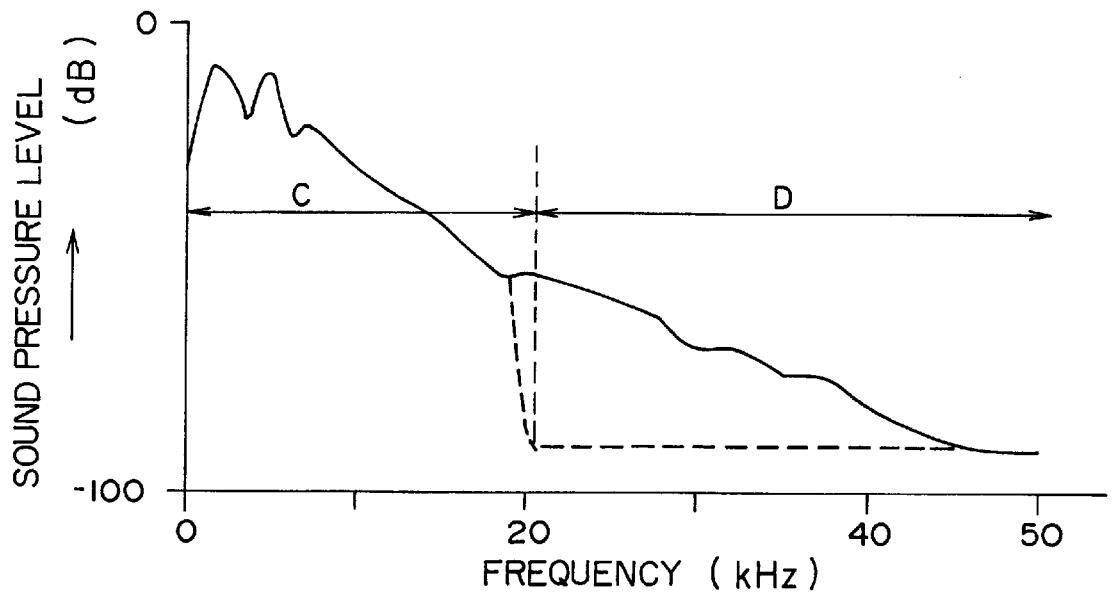
FIG. 3 is a spectrum of a music signal.

This applicant's study has determined that, as shown in FIG. 3, when compressing reversibly this high-quality music information data, the amplitude in an ultrasound area D is relatively less than that in an audible band C (a broken line part shown in FIG. 3); thus the reversible compression rate is approximately 60%, i.e. the amount of music information data to be transmitted is approximately 40% of the music information data of 88.2 kHz sampling and 20-bit quantization.

A value estimated by FIG. 3 and the above document in this application, will be explained such that the reversible compression rate of the high-quality music information data of 88.2 kHz sampling and 20-bit quantization, is approximately 60% i.e. the amount of data to be transmitted is originally approximately 40%.

Then the embodiment explains the conditions that the recording and reproducing time of music information (music program source) recorded on the signal recording area AP of the first area A, and that on the signal recording area BP of the second area B, are the same and the longest.

In the embodiment, CD-formatted music information data is recorded on the signal recording area AP of the first area A. A CD format can record and reproduce up to 74.7-minute music, if all radiuses of 25 to 58 mm of a program area (i.e. signal recording area e) are used. Also, on the signal recording area BP of the second area B, music information data is recorded at a density 4.5 times that of the signal recording area AP.

For this reason, when all radiuses of 25 to 58 mm (signal recording area e) are used for recording music information data at a density 4.5 times that of the signal recording area AP, up to 336-minute music can be recorded and reproduced, as shown by the following equation:

(74.7 minutes * 4.5/2.5)/0.4=336 minutes

Assuming that recording and regenerating time of music information recorded on the signal recording area AP of the first area A, is X1 minutes; recording and regenerating time of music information recorded on the signal recording area BP of the second area B, is X2 minutes; and the area of a 25 to 58 mm radius area (signal recording area e) is normalized as 1, the normalized area of the first area A would be:

$X1/74.7$;

and the normalized area of the second area B would be:

$X2/336$

Using all areas of 25 to 58 mm radius areas, the normalized areas of two areas A and B are summed to make the following equation (1):

$$X1/74.7 + X2/336 = 1 \quad (1)$$

Also the condition that the recording and regenerating time of music information recorded on the first area A and that of the second area B are the same, makes the following equation (2):

$$X1 = X2 \quad (2)$$

Solve the equations (1) and (2) as simultaneous equations to obtain:

X1=61 minutes

X2=61 minutes

On the boundary of the first area A and the second area B needs readout area AO of the first area, and readin area BI of the second area. The actual regenerating time is subtracted from each burden of approximately 1 minute to obtain:

X1=60 minutes

X2=60 minutes

The above describes the disc that can record and reproduce 60-minute CD-quality music information on the signal recording area AP of the first area A on the inner side of one optical disc 1, and 60-minute high-quality music information of 88.2 kHz sampling and 20-bit quantization on the signal recording area BP of the second area B outside the disc. This disc 1 records the same music information by CD quality that is standard quality, and by quality higher than CD quality, i.e. is a single inventory; therefore it is significant for both music publishers and users who purchase the discs.

[Second Embodiment]

The second embodiment of the information recording disc of the invention is a 120 mm diameter audio disc. The disc thickness is 1.2 mm.

The second embodiment describes an example that music information data recorded on the signal recording area BP of the second area B, has a fixed transfer rate without reversible compression technology.

The music information data recorded on the signal recording area AP of the first area A, is recorded by a CD format like said first embodiment. In the embodiment, the recording density of music information data recorded on the signal recording area BP of the second area B, is 4.5 times that of the music information data recorded on the signal recording area AP of the first area A. Also the music information sources recorded on the two signal recording areas AP and BP are completely the same.

The music information data recorded on the signal recording area AP of the first area A, is for up to a music signal audible band (to approximately 20 kHz), and becomes data by a CD sampling rate (44.1 kHz sampling frequency) and the number of quantized bits of 16.

On the other hand, the music information data recorded on the signal recording area BP of the second area B, is for up to a music signal ultrasound band above an audible band (to approximately 50 kHz). 88.2 kHz sampling frequency and the number of quantized bits of 20 are relatively higher than the sampling rate and the number of quantized bits used for recording music information on the signal recording area AP. The method for recording all this music information data, just as it is, like a CD, has a fixed transfer rate like the CD.

Then the embodiment explains the conditions that the recording and reproducing time of music information recorded on the signal recording area AP of the first area A, and that on the signal recording area BP of the second area B, are the same and the longest. In the embodiment, CD-formatted music information data is recorded on the signal recording area AP of the first area A. A CD format can record and regenerate up to 74.7-minute music, if all radiuses of 25 to 58 mm of a program area (i.e. signal recording area e) are used.

Also, on the signal recording area BP of the second area B, music information data is recorded at a density 4.5 times that of the signal recording area AP. For this reason, when all radiuses of 25 to 58 mm (signal recording area e) are used for recording music information data at a density 4.5 times that of the signal recording area AP, up to 134.5-minute music can be recorded and regenerated, as shown by the following equation:

$$74.7 \text{ minutes} * 4.5/2.5 = 134.5 \text{ minutes}$$

Assuming that recording and reproducing time of music information recorded on the signal recording area AP of the first area A, is X1 minutes; recording and reproducing time of music information recorded on the signal recording area BP of the second area B, is X2 minutes; and the area of a 25 to 58 mm radius area (signal recording area e) is normalized as 1, the normalized area of the first area A would be:

$$X1/74.7;$$

and the normalized area of the second area B would be:

$$X2/134.5$$

Using all areas of 25 to 58 mm radius areas, the normalized areas of two areas A and B are summed to make the following equation (3):

$$X1/74.7 + X2/134.5 = 1 \qquad (3)$$

Also the condition that the recording and reproducing time of music information recorded on the first area A and that of the second area B are the same, makes the following equation (4):

$$X1 = X2 \qquad (4)$$

Solve the equations (3) and (4) as simultaneous equations to obtain:

X1=48 minutes

X2=48 minutes

On the boundary of the first area A and the second area B needs readout area AO of the first area, and readin area BI of the second area. The actual reproducing time is subtracted from each burden of approximately 1 minute to obtain:

X1=47 minutes

X2=47 minutes

The above describes the disc that can record and reproduce 47-minute CD-quality music information on the signal recording area AP of the first area A on the inner side of one optical disc 1, and 47-minute high-quality music information of 88.2 kHz sampling and 20-bit quantization on the signal recording area BP of the second area B outside the disc. This disc 1 records the same music information by CD quality and by quality higher than CD quality, i.e. is a single inventory; therefore it is significant for both music publishers and users who purchase the discs.

Since this disc 1 is not reversibly compressed like the first embodiment, extended operation for resetting compression with a regenerating player needed not be performed.

[Third Embodiment]

The third embodiment of the information recording disc of the invention is a 120 mm diameter video disc. The disc thickness (a distance from a disc surface (protective layer) to a disc signal surface) is 1.2 mm.

The first area A located on the inner side starting reproduction is recorded with a CD format (conforming to JIS S 8605 standard) like said first embodiment. The CD format contains a format called a video CD which uses a known MPEG1 standard to record and reproduce an animation of 352×240 pixels. The readin area AI of 23 to 25 mm radius, included in the first area A, is recorded by a video CD format.

The recording density of video information recorded on the signal recording area BP of the second area B, is favorably 2 to 10 times the recording density of the signal recording area AP. In the embodiment, the recording density is 4.5 times (3.7 GB recording space on the entire signal recording surface 2) that of the signal recording area AP (0.8 GB recording space on the entire signal recording surface 2). Also the video sources recorded on the two signal recording areas AP and BP are completely the same.

The video information program recorded on the signal recording area BP of the second area B is for moving picture of 720×480 pixels using a known MPEG2 standard.

To record such moving picture, a compression rate is changed depending on the contents of the moving picture, and a variable transfer rate system that changes a transfer rate is used. Since such example is often explained, the detailed explanation is omitted. It is described in the embodiment that the recording density for a diameter of 120 mm with the MPEG2 standard is 4.5 times that of a CD.

Then, the embodiment explains the conditions that the recording and reproducing time of video information (video program source) recorded on the signal recording area AP of the first area A, and that on the signal recording area BP2 of the second area B, are the same and the longest.

In the embodiment, video CD-formatted video is recorded on the signal recording area AP of the first area A. A video CD format can record and reproduce up to approximately 74-minute video, if all radiuses of 25 to 58 mm of a program area (i.e. signal recording area e) are used.

Also, on the signal recording area BP of the second area B, video information data is recorded at a density 4.5 times that of the signal recording area AP. For this reason, when all radiuses of approximately 25 to 58 mm (signal recording area e) are used for recording video information data at a density 4.5 times that of the signal recording area AP, an MPEG2 standard video can be recorded and regenerated for approximately 135 minutes using a variable transfer rate system.

The time relation of the above example is similar to the examples of the equations (3) and (4) of the second embodiment; in the third embodiment, each recording and reproducing time of the first and second areas is approximately 47 minutes.

The above describes the disc that can record and reproduce approximately 47-minute CD-quality video information on the signal recording area AP of the first area A on the inner side of one optical disc 1, and approximately 47-minute high-quality video information of 88.2 kHz sampling and 20-bit quantization on the signal recording area BP of the second area B outside the disc. This disc 1 records the same video information by MPEG1 and MPEG2 qualities i.e. is a single inventory; therefore it is significant for both publishers and users who purchase the discs.

Figure 4:
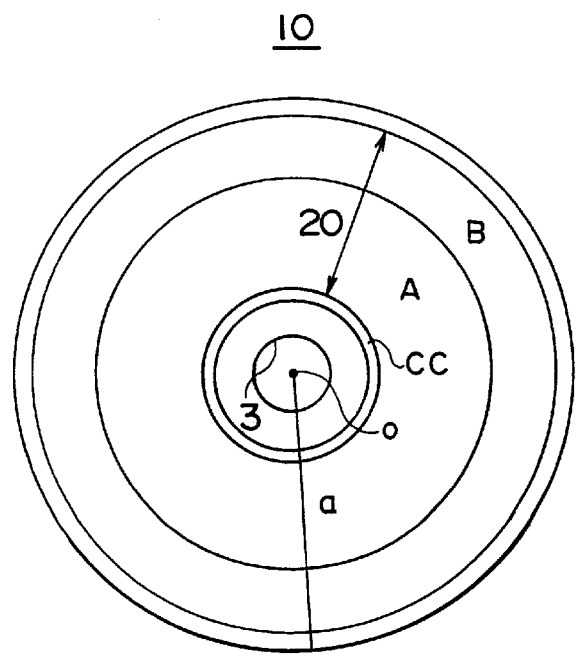
FIG. 4 is a further external view of the information recording disc of the invention.

Unlike the above optical disc 1 structure, an optical disc 10 that is another information recording disc of the invention provides a signal recording surface 20 having the first area A and the second area B segmented sequentially in the radius direction from the center hole 3, as shown in FIG. 4. A third area CC is provided on the inner side (the center hole 3 side) adjacent to the first area A.

As described later, a readin signal in relation to a first data recorded on the second area B, that is an information signal that has the same recording density as that of the first data, is recorded on the third area CC. This information signal is a readin signal focusing on a test signal correcting TOC (contents) information and a player.

Figure 5:
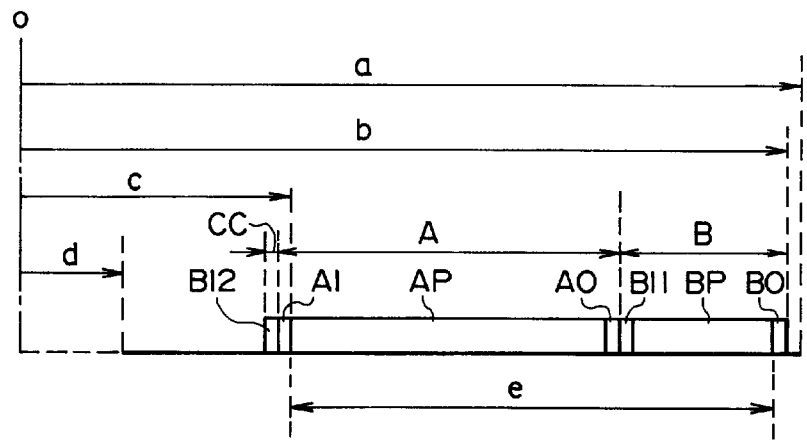
FIG. 5 is a diagram for explaining an information area recorded on the information recording disc in FIG. 4.

As shown in FIG. 5, on the information area recorded in the radius direction of the optical disc 10, "a" is a radius of the optical disc 10; "b" is a radius from the center o of the center hole 3 to outermost (readout) part of the signal recording surface 20; "c" is a radius from the center o of the center hole 3 to innermost (readin) part of the signal recording surface 20; "d" is a radius of the center hole 3; and "e" is a signal recording area of the signal recording surface 20.

The first area A is composed of readin area AI, signal recording area AP, and readout area AO.

The second area B is composed of readin area BI1, signal recording area BP, and readout area BO.

The third area CC is readin area BI2 that records a readin signal having at least data of a readin signal recorded on the readin area BI1.

In other words, the contents of a readin signal recorded on the readin area BI1 of the second area B, is duplicated with the contents of a readin signal recorded on the third area CC; therefore if the readin signal recorded on the third area CC is considered main, it is not inconvenient to, if necessary, change (reduce) the contents of the readin signal recorded on the readin area BI1 of the second area B (simplification of the readin signal recorded on the readin area BI1).

For this changing example, for TOC information wherein the same data is generally overwritten over and over again to avoid reading miss, only once TOC information is written only in the readin signal recorded on the readin area BI1. As a result, the recording space on the readin area BI1 can be reduced by this unoverwritten part. Only this reduced space may be devoted to an increase in the recording space of the signal recording area BP.

[Forth Embodiment]

Next, the forth embodiment of the information recording disc of the invention is concretely explained with a 120 mm diameter audio disc. The disc thickness (a distance from disc surface (protective layer) to disc signal surface) is 1.2 mm.

The first area A located on the inner side starting reproducing is recorded with a CD format (conforming to JIS S 8605 standard). 23 to 25 mm radius readin area AI, included in the first area A, is recorded by a CD format.

It is easy to set a status on this readin area AI so that a newly formatted reproducing apparatus (player) can read existence of the second area B, without affecting a conventional CD player at all. For example, a definition may be assigned to an unused bit of TOC (Table of Contents) recorded with a CD subcode, to set a status in which the second area B exists.

After termination of music information recorded on the signal recording area AP, the defined length of a readout track (readout area AO) is recorded on the first area A for termination.

The music information program recorded on the signal recording area AP of the first area A, becomes data by a CD sampling rate (44.1 kHz sampling frequency) and the number of quantized bits of 16.

On the other hand, for the music information program recorded on the signal recording area BP of the second area B, 88.2 kHz sampling frequency and the number of quantized bits of 20 are relatively higher than the sampling rate and the number of quantized bits used for recording music information on the signal recording area AP.

The recording density of music information recorded on the signal recording area BP of the second area B, is favorably 2 to 10 times the recording density of the signal recording area AP. In the embodiment, the recording density is 4.5 times (3.7 GB recording space on the entire signal recording surface 2) that of the signal recording area AP (0.8 GB recording space on the entire signal recording surface 2). Also the music sources recorded on the two signal recording areas AP and BP are completely the same.

A newly formatted reproducing apparatus (player) is used for reproduction of the signal recording area BP of the second area B. To reproduce this music information data, the newly formatted reproducing apparatus uses buffer memory, pickup kick wait and search functions, and reproducing technology (the basic explanation of this technology is described in Japanese Patent Laid-Open No. 223669/1989).

Since the third area CC and the second area B are reproduced with a newly formatted reproducing apparatus (player), this player can determine the side more inner than a CD format, e.g. the third area CC provided with a radius of 22.5 to 23 mm, as a readin area.

Constructing the disc like the above, a CD player and a high-density newly formatted player can first reproduce a readin area corresponding to each recording density, optimizing a signal reading condition for each player.

Then, an optical disc 100 that is an information recording disc of the invention, with a different structure from that of both the above optical discs 1 and 10, is explained.

As mentioned above, a CD as a music information recording disc is well known in the art. The CD reading is system-designed so as to use a 780 nm laser wavelength, while a laser with around a 635 nm laser light wave has been practiced in recent years; a high-density disc that reads with this is under development. Here it is called high-density CD.

On the other hand, coexisting of a CD recording density area and a high-density CD recording density area on one disc, is considered to provide extensive application.

Against the 780 nm CD reading laser wavelength, a high-density CD disc under development that is not of a public standard, is system-designed so as to read with a short wavelength laser of around 635 nm. In relation to these, the pit depth of the disc is determined in relation to 0.25 times a reading laser wavelength. The invention is explained below by taking a disc wherein many pit rows form a signal track to record information, as an example.

Although a pit depth is not defined as a standard, a reproducing signal characteristic with a standard light pickup to be defined with a standard, is defined with a range. As a result, the pit depth is determined with a range. The recording original disc film thickness directly related to the pit depth is equivalently approximately 100 to 125 nm to satisfy a CD standard; and is equivalently approximately 85 to 105 nm for a high-density CD standard. Since the reproducing signal characteristic related to the pit depth is not determined only by the recording original disc film thickness, and is changed by conditions of: recording development, pressing stamper producing, press and so on, here "equivalently" is represented with the value of the recording original disc film thickness, including these fluctuations.

Figure 7:
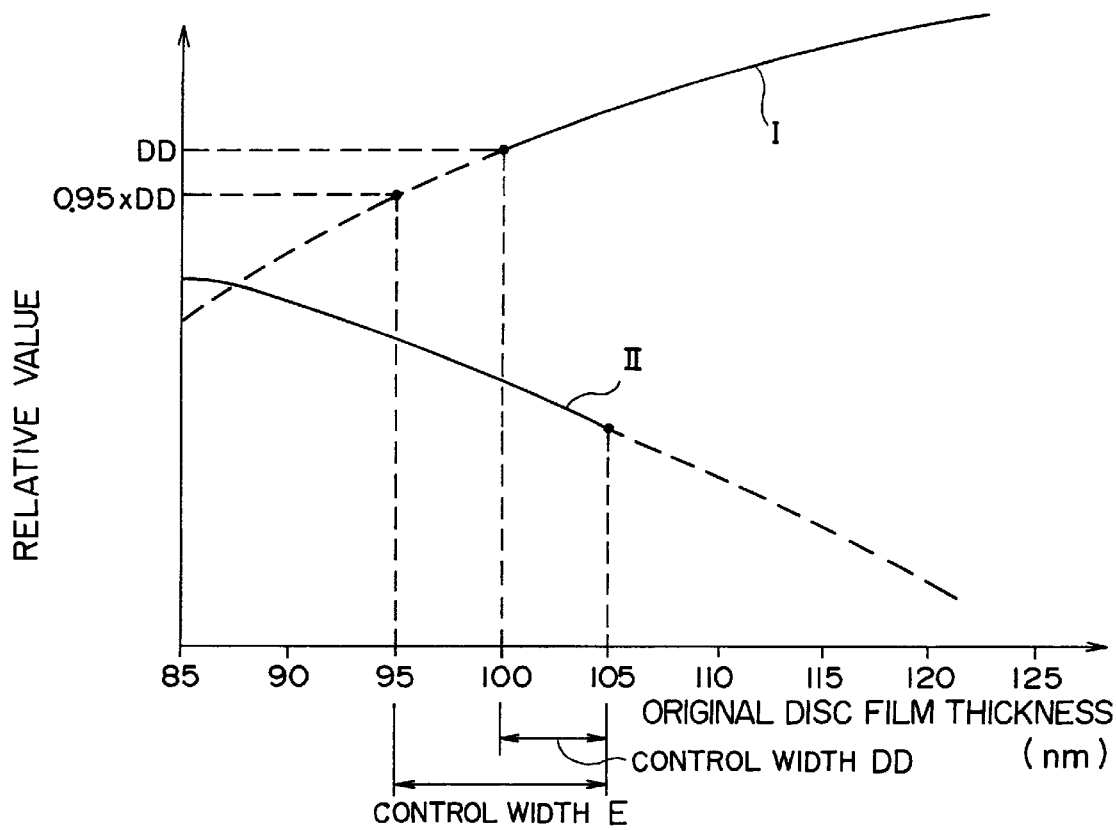
FIG. 7 is a diagram showing a signal characteristic of the information recording disc in FIG. 6.

The pit shallower than a standard value increases push pull tracking output obtained by differentially detecting the reflective light of a reading laser that is irradiated on the pit, and decreases a degree of modulation of the signal. On the contrary, the pit deeper than a standard value decreases push pull tracking output, and increases a degree of modulation of the signal. This is shown in FIG. 7. In the same diagram, I is a degree of modulation of a CD signal; and II is the push pull tracking output of a high-density CD signal.

Figure 6:
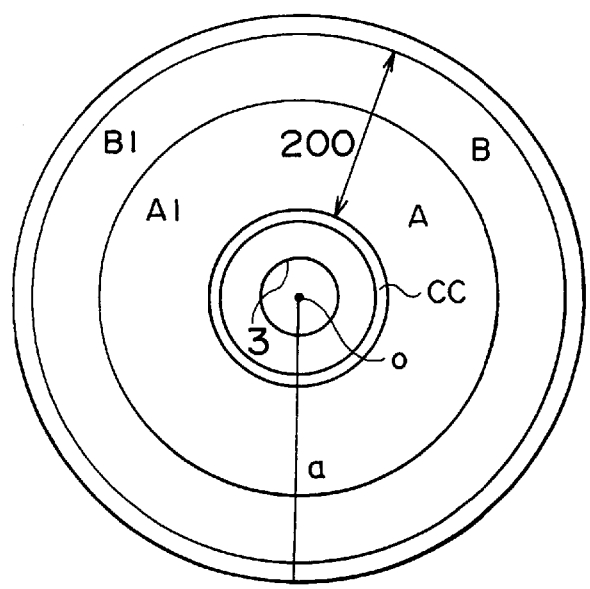
FIG. 6 is a further external view of the information recording disc of the invention.

As shown in FIG. 7, when a CD area (low-density recording area and the first area) and a high-density CD area (high-density recording area and the second area) satisfy each standard to coexist on one disc, as shown in FIG. 6 below, the recording original disc film thickness range satisfying both standards is equivalently 100 to 105 nm, as shown in a control width DD (illustrated in FIG. 7), and is narrow for a producing control width (an equivalent film thickness control width for production with disc producing steps).

The reproducing signal characteristic related to the pit depth is not determined only by the recording original disc film thickness, and is changed by the conditions of: recording development, pressing stamper producing, press and so on, requiring control including these.

In relation to the mechanical accuracy characteristic of the disc, as a typical item, a disc warp (tilt) characteristic is 0.6 degrees for a CD standard, and is, e.g. 0.35 degrees for a high-density CD standard. When a CD area and a high-density CD area coexist on one disc, applying a mechanical accuracy characteristic standard of the high-density CD to the CD area can achieved with a small burden.

By producing a disc to satisfy this standardized in this way, the tilt for the regenerating signal deterioration on the CD area is not, as a typical item, 0.6 degrees, but may be allowed for 0.35 degrees.

The main operation of the invention is that allowance for CD area reproduction produced by less allowance for the reproducing signal deterioration that is the above 0.35-degree tilt, is devoted to resolve an equivalent recording original disc film thickness range of a narrow producing control width DD of 100 to 105 nm. In the reproducing signal characteristic of the CD area of the disc of the invention, if a degree of modulation of a CD standard is slightly changed to, e.g. 0.95 times that of recording, at a recording density of a CD area, the entire signal recording surface including a CD area and a high-density CD area, the equivalent recording original disc film thickness range satisfying both of the high-density CD standard and the CD area standard after change is approximately 95 to 105 nm, as shown with a control width E in FIG. 7, extending sufficiently the producing control width. Still the equivalent film thickness is approximately 85 to 105 nm for the high-density CD standard. From curve I in FIG. 7, a degree of modulation of the CD standard on the CD area the disc of the invention is approximately 0.7 times that of recording said entire signal recording surface at a recording density of the CD area. In terms of the intensity of a signal, a higher degree of modulation is better, and favorably 0.8 to 0.95 times.

The amount of jitter for reproducing signal deterioration, when a degree of signal modulation of the CD area of the disc of the invention is 0.95 times that of the CD standard, is 0.5% or below. On the other hand, the amount of jitter for reproducing signal improvement, when a disc tilt is not 0.6 degrees for the CD standard, but 0.35 degrees, is 1% or above. Likewise, improvement in such as shake and eccentricity other than the tilt, is contributed as improvement in a reproducing signal. Also the described mechanical accuracy standard, and an optical accuracy such as a refractive characteristic, are alike.

The above describes the embodiment of the information recording disc with reasonability shown by the deteriorated and improved amount of jitter, mechanical and optical accuracies standards of a disc based on that the entire disc surface has the density of a high-density CD area, is applied to all areas of a disc having a CD area and a high-density CD area of the invention; and the signal characteristic standard of the CD area of the disc of the invention is changed, in comparison with that of a standard based on that the entire disc surface has the density of the CD area.

The invention is explained with an example of a phase pit by placing emphasis on understandability. This is alike to the depth of a groove tracking. The invention can be applied to a disc with a recording and reproducing method changing the amount of a reflective light, and a optical magnet method changing the polarized angle of a reflective light.

[Fifth Embodiment]

The structure of the information recording disc of the invention is explained below with FIGS. 6 and 8.

The optical disc 100 that is the fifth embodiment of the information recording disc of the invention, provides the signal recording surface 200 having the first area A and the second area B segmented sequentially in the radius direction from the center hole 3, as shown in FIG. 6. Also the third area CC is provided on the inner side (the center hole 3 side) adjacent to the first area A. In the same diagram, "o" is a disc center; and "a" is a radius. For example, the diameter of the optical disc 100 is 120 mm; the radius "a" is 60 mm; and the diameter of the center hole 3 is 15 mm.

As described later, the third area CC is a readin area wherein a readin signal in relation to a second data recorded on the second area B is recorded at the same recording density as that of the second data. This readin signal focuses on a test signal correcting TOC information and a player.

Figure 8:
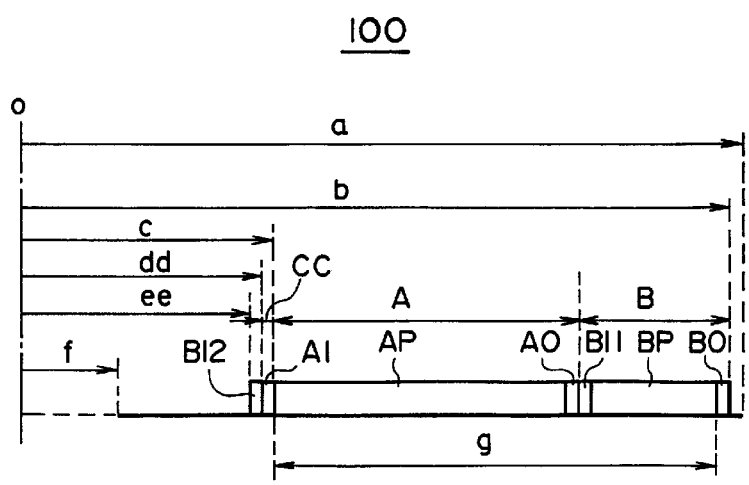
FIG. 8 is a diagram for explaining an information area recorded on the information recording disc in FIG. 6.

As shown in FIG. 8, on an information area recorded in the radius direction of the optical disc 100, "b" is a radius from the center "o" of the center hole 3 of the optical disc 100 to the outermost (readout) part of the signal recording surface 200; "c" is a radius from the center "o" to the innermost (readin) part of the signal recording surface 200; dd is a radius from the center "o" to the outermost part of the third area CC; ee is a radius from the center "o" to the innermost part of the third area CC; "f" is a radius of the center hole 3; "g" is a signal recording area width of a signal recording surface 200.

For example, if the radius "a" is 60 mm, the radius "b" is 58.5 mm; the radius "c" is 25 mm+0 mm to 25 mm−0.2 mm; the radius dd is 23.0 mm+0 mm to 23.0 mm−0.2 mm; the radius ee is from the center "o" to max. 22.5 mm; and the radius "f" is 7.5 mm.

The first area A is composed of readin area AI that is the first readin area, signal recording area AP on which the first data is recorded, and readout area AO.

The second area B is composed of readin area BI1, signal recording area BP on which the second data is recorded, and readout area BO that is the second readout area.

The third area CC is the second readin area, and readin area BI2 recording a readin signal having at least data of a readin signal recorded on the readin area BI1 of the second area B.

In other words, the contents of a readin signal recorded on the readin area BI1 of the second area B, is duplicated with the contents of a readin signal recorded on the third area CC; therefore if the readin signal recorded on the third area CC is considered main, it is not inconvenient to, if necessary, change (reduce) the contents of the readin signal recorded on the readin area BI1 of the second area B (simplification of the readin signal recorded on the readin area BI1).

As the example of this change, in general TOC information records repeatedly the same data with 2 mm or more width in the radius direction to avoid reading miss. The readin signal recorded on the readin area BI1 writes the TOC information only with 0.3 mm width in the radius direction. As a result, the recording space on the readin area BI1 can be reduced. Only this reduced space may be devoted to an increase in the recording space of the signal recording area BP.

Then, the information recording disc of the invention is concretely explained with a 120 mm diameter audio disc. The disc thickness (a distance from a disc surface (protective layer) to a disc signal surface) is 1.2 mm. The first area A and the second area B have the same pit depth.

The first area A located on the inner side starting reproduction is recorded with a CD format (conforming to JIS S 8605 standard). The readin area AI of 23 to 25 mm radius, included in the first area A, is recorded by the CD format.

It is easy to set a status on this readin area AI so that a newly formatted reproducing apparatus (player) can read existence of the second area B, without affecting a conventional CD player at all. For example, a definition may be assigned to an unused bit of TOC (Table of Contents) recorded with a CD subcode, to set a status in which the second area B exists.

After termination of music information recorded on the signal recording area AP, the defined length of a readout track (readout area AO) is recorded on the first area A for termination.

The music information program recorded on the signal recording area AP of the first area A, becomes data by a CD sampling rate (44.1 kHz sampling frequency) and the number of quantized bits of 16.

On the other hand, for the music information program recorded on the signal recording area BP of the second area B, as an example, 88.2 kHz sampling frequency and the number of quantized bits of 20 are relatively higher than the sampling rate and the number of quantized bits used for recording music information on the signal recording area AP.

The recording density of music information recorded on the signal recording area BP of the second area B, is favorably 2 to 10 times the recording density of the signal recording area AP. In the embodiment, the recording density is 4.5 times (3.7 GB recording space on the entire signal recording surface 200) that of the signal recording area AP (0.8 GB recording space on the entire signal recording surface 2). Also the music sources recorded on the two signal recording areas AP and BP are completely the the same.

A newly formatted reproducing apparatus (player) is used for reproduction of the signal recording area BP of the second area B. To reproduce this music information data, the newly formatted reproducing apparatus uses buffer memory, pickup kick wait and search functions, and reproducing technology (the basic explanation of the technology is described in Japanese Patent Laid-Open No. 223669/1989).

Since the third area CC and the second area B are reproduced with a newly formatted reproducing apparatus (player), this player can determine the side more inner than a CD format, e.g. the third area CC provided with a radius of 22.5 to 23 mm, as a readin area.

Constructing the disc like the above, a CD player and a high-density newly formatted player can first reproduce a readin area corresponding to each recording density, optimizing a signal reading condition for each player.

The above optical disc 100 records information on the first area A at a low recording density of a CD, and records information on the second area B at a high recording density of a high-density CD. Needless to say, the invention is not limited to this construction, the optical disc may record information on the first area A at a high recording density of a high-density CD, and record information on the second area B at a low recording density of a CD.

(B) Two-disc bonded construction of the information recording medium of the invention is explained along FIGS. 9 to 12.

[Sixth Embodiment]

Figure 9:
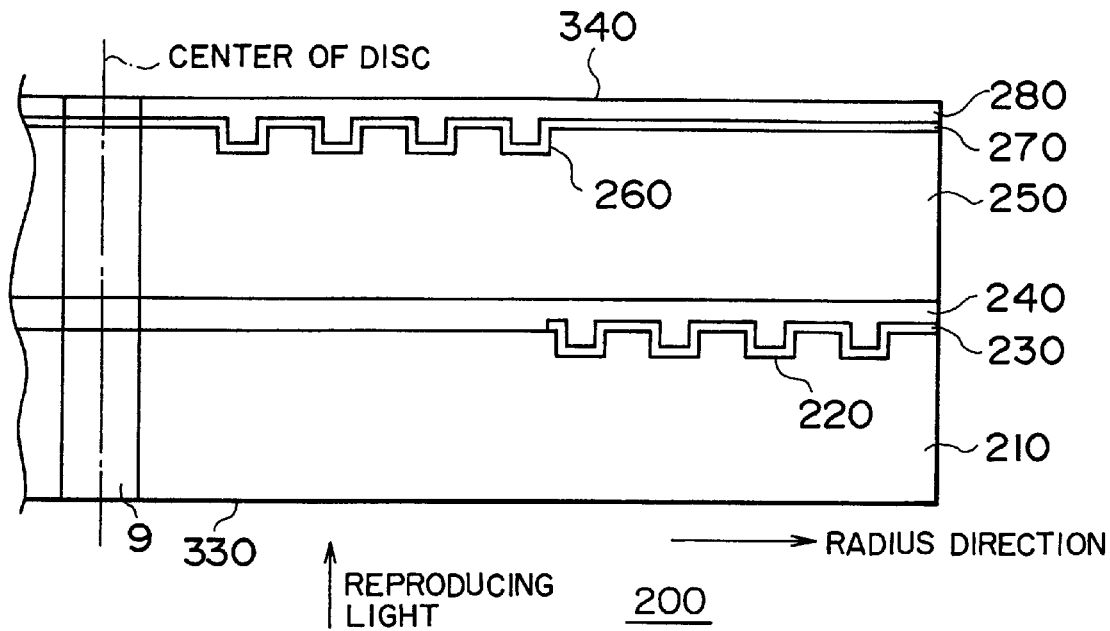
FIG. 9 is a cross-sectional view of the information recording disc of the invention.

FIG. 9 is a cross-sectional view showing the sixth embodiment of the information recording disc in relation to the invention, and is a cross-sectional view cut on a cross section through the center of a optical disc 200.

In FIG. 9, on a disc-like disc substrate (first substrate) 210 having optical transparentness, a first recording layer 220 wherein a convex and recessed shape information pit is formed spirally on the outer side thereof, is formed. On this first recording layer 220, a first reflective layer 230 is multilayered.

Also on a disc-like disc substrate (second substrate) 250, having the same thickness as said first substrate 210 and optical transparentness, a second recording layer 260 wherein a convex and recessed shape information pit is spirally formed on the inner side thereof, is formed. On this second recording layer 260, a second reflective layer 270 and a protective layer 280 are formed.

Both of said first substrate 210 and second substrate 250 have a disc thickness of approximately 0.6 mm, said first recording layer 220 being recorded according to high-density recording specifications, e.g. at a recording density 4 times that of a CD, and said second recording layer 260 being recorded according to low-density recording specifications, e.g. at the same recording density as that of a CD.

The optical disc 200 is produced by bonding through a bonding layer 240 the first substrate 210 and second substrate 250 that are worked as described above. In this case, said first recording layer 220 is located near the center of the thickness direction of the optical disc 200, i.e. near the bonding layer 240; and said second recording layer 260 is located near a surface 340 of the optical disc 200.

The reflective rate of said first reflective layer 230 is approximately 95%; and the reflective rate of said second reflective layer 270 is also approximately 95%.

Said optical disc 200 is regenerated by irradiating a laser light (regenerating light) from a surface 330 side of the optical disc.

The optical disc 200 has a construction bonding two disc substrates of a thickness of 0.6 mm. Also on the second recording layer 260 located in proximity to the surface 340 opposite to a signal reading side, information is recorded at a low density like a CD on the inner side of the disc 200, and the second reflective layer 270 is coated thereon. The thickness of said optical disc 200 bonded is 1.2 mm, which is optimum for a currently-common CD player.

In order to read reliably the information of said second recording layer 260, coating of the first reflective layer 230 is not formed on the inner side by taking a means such as masking. For this reason, a reproducing laser light arrives at the second recording layer 260 with little loss; and the reflective light reaches a reading optical head with little loss.

Said first recording layer 220 is formed only on the outer side in proximity to the bonding layer 240, and records information with high-density optical disc specifications. On this first recording layer 220, the first reflective layer 230 is coated to reflect a regenerating light. The thickness of the optical disc in this part is substantially 0.6 mm, and is suitable for a high-density optical disc, and a high-density optical disc regenerating apparatus.

[Seventh Embodiment]

Figure 10:
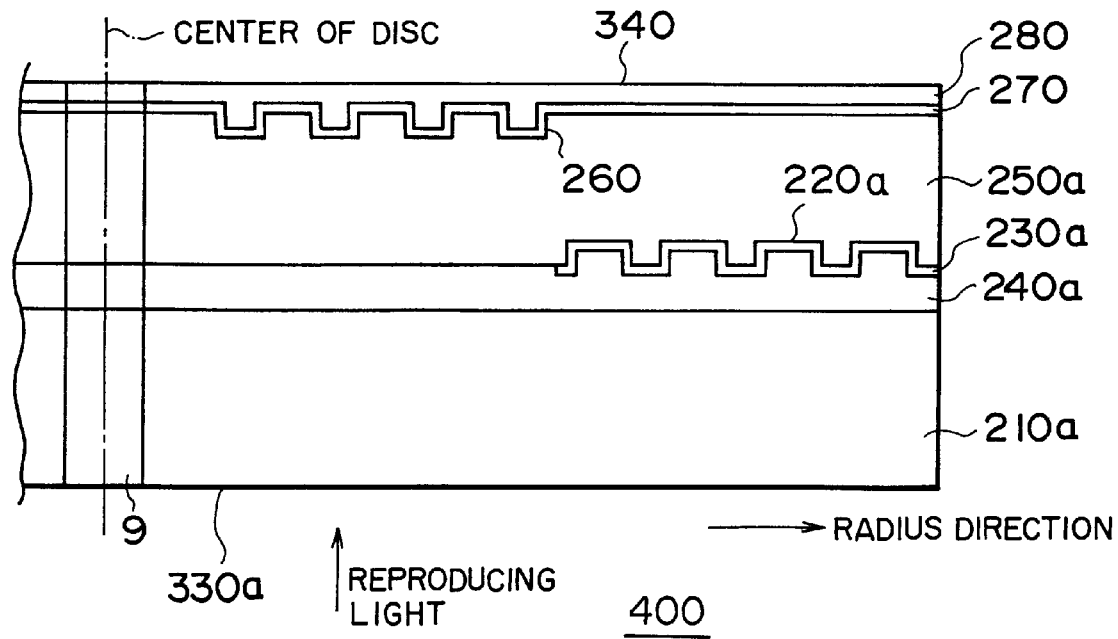
FIG. 10 is a further cross-sectional view of the information recording disc of the invention.

FIG. 10 is a cross-sectional view showing an optical disc 400 that is the seventh embodiment of the invention. Unlike the optical disc 200 shown in FIG. 9, a first recording layer 220a recorded at a high density is not formed on a first substrate 210a side, but on a second substrate 250a side.

In other words, low-density recording is made on the inner side (the inner side area) of one side of the second substrate 250a; high-density recording is made on the outer part (the outer side area) of the other side of it. The first substrate 210a is an optically transparent disc that does not record information. Said first substrate 210a and second substrate 250a have a thickness of approximately 0.6 mm, and are bonded through the bonding layer 240a.

[Eighth Embodiment]

Figure 11:
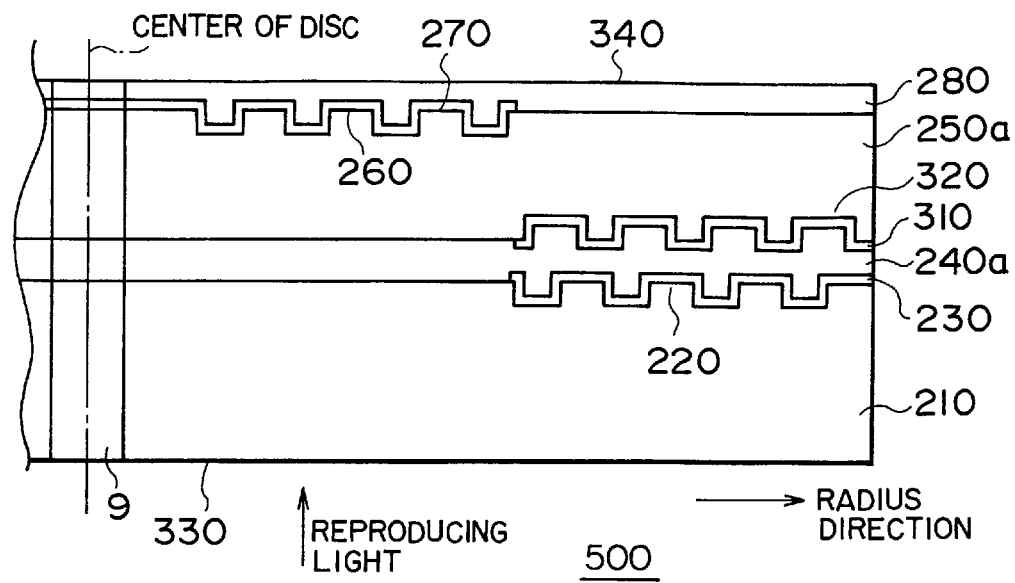
FIG. 11 is a further cross-sectional view of the information recording disc of the invention.

FIG. 11 is a cross-sectional view showing an optical disc 500 that is the eighth embodiment of the invention. Unlike the optical disc 200 shown in FIG. 9, a third recording layer 320 recorded at a high density is formed on the second substrate 250a side; and the reflective rate of said first reflective layer 230 is a high reflective rate or low reflective rate.

In other words, for the optical disc 500, low-density recording is made on the inner side of one side of the second substrate 250a; high-density recording is made on the outer part of on the other side of it. The first substrate 210 is an optically transparent disc that does not record information. Said first substrate 210 and second substrate 250a have a thickness of approximately 0.6 mm, and are bonded through the bonding layer 240a.

Said third recording layer 320 is formed on the bonding layer 240a side of said second substrate 250a, and is provided on the outer side like the first recording layer 220. Also a third reflective layer 310 is multilayered on said third recording layer 320.

The reflective rate of said first reflective layer 230 is approximately 30% or 95%; and the reflective rate of said second reflective layer 270 and third reflective layer 310 is approximately 95%.

The high-density recording part on the optical disc 500 is double sided, and is a so-called dual-layer disc, if the first reflective layer 230 is a semipermeable film; therefore, the recording layers 230 and 260 can be regenerated from the single side. On the other hand, if the first reflective layer 230 and the third reflective layer 310 have both a high reflective rate, the first recording layer 220 and the third recording layer 320 are regenerated by reversing the irradiating direction of a laser light.

Still, there is a note for the location relation between said inner part and said outer part on the information recording disc of the invention. This note is explained below, based on FIGS. 11 and 12.

Figure 12:
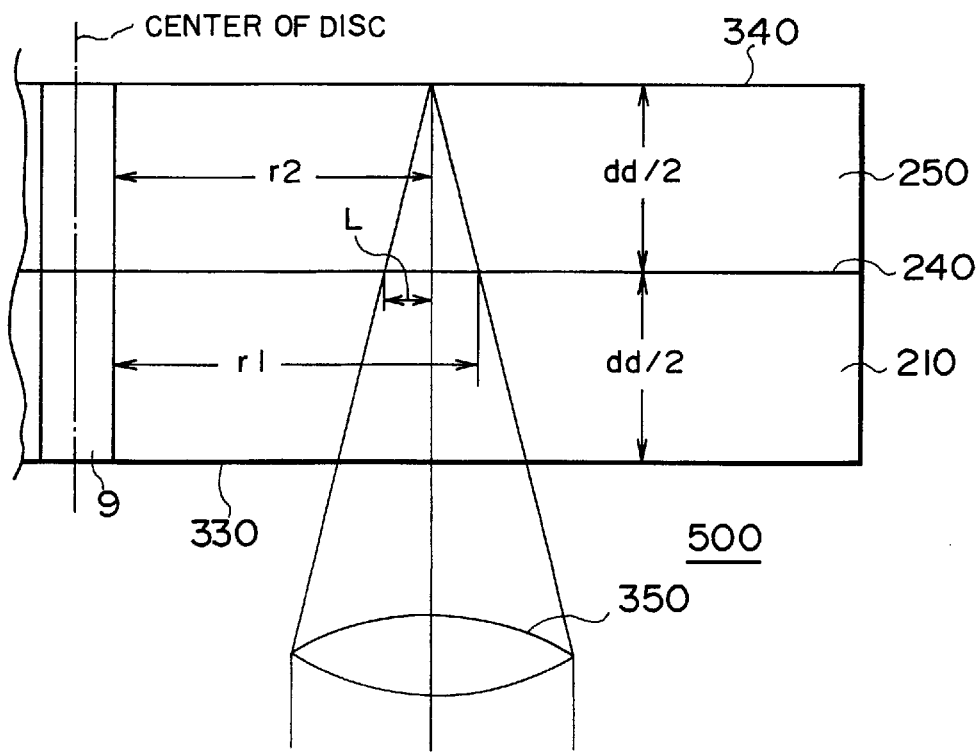
FIG. 12 is an explaining diagram of an unrecordable part.
Figure 13:
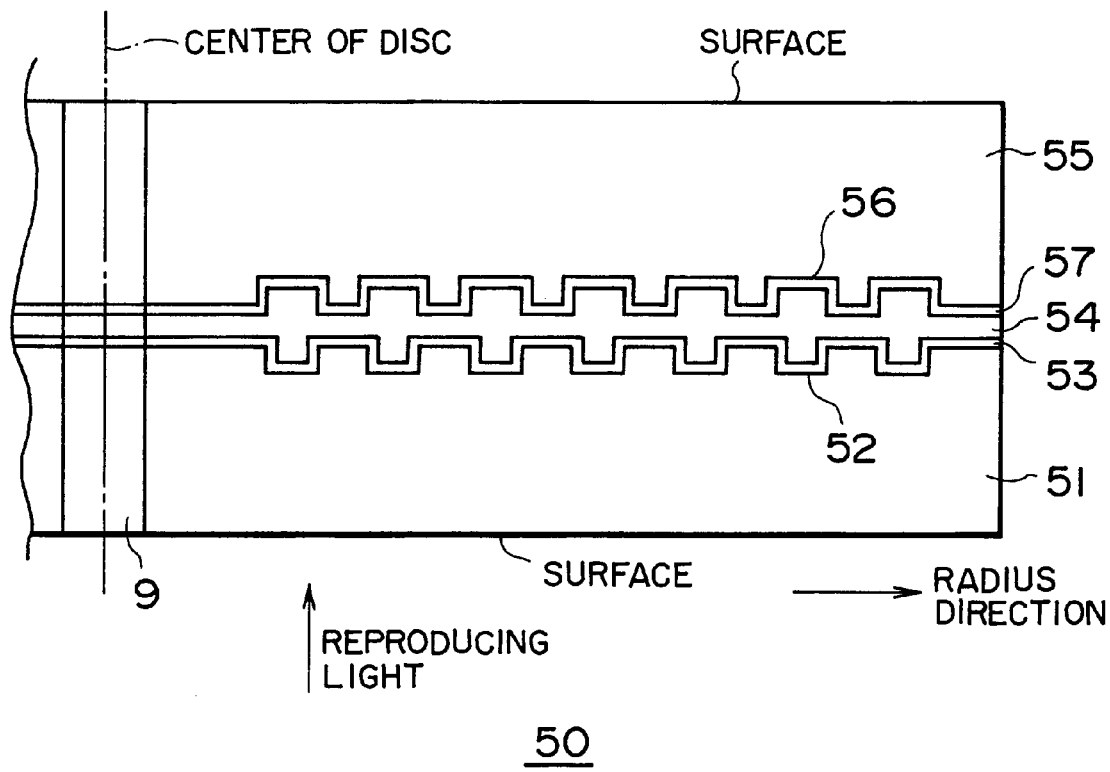
FIG. 13 is a cross-sectional view of a conventional information recording disc.

FIG. 12 is a explanation view of an unrecordable part wherein a high-density recording part is double sided. In the same diagram, to simplify the explanation, the location of said second recording layer 260 is shown on the same location as the surface 340 of the optical disc 500, omitting the thickness of said bonding layer 240.

Said first recording layer 220 and third recording layer 320 are provided on the outer side from a radius r1; and said second recording layer 260 is provided on the inner side from a radius r2. Also a laser light regenerating information of the second recording layer 260 of the optical disc 500 is irradiated from said first substrate 210 side through an objective lens 350.

In order that the laser light is not blocked on said first reflective layer 230 or third reflective layer 310, an unrecordable part is produced between an area of the inner side from the radius r2 and an area of the outer side from the radius r1. (r1–r2) may be called crossing length and is shown with L in the diagram. Also when the thickness of said first substrate 210 and second substrate 250a is dd/2, and said crossing length is L, said L needs to satisfy the following equation: $L > (dd/2) * \tan(\arcsin(NA/n))$ where n is the reflective rate of the first substrate 210 and the second substrate 250a, and NA is the number of apertures of the objective lens 350.

In the case of d=1.2 mm, n=1.5, and NA=0.6, L>0.26 mm is obtained. The unrecordable area is found to be a relatively small range.

Reproduction of the optical disc in the sixth to eighth embodiment of the invention is described below.

A CD player starts reproduction from the innermost part of the optical disc. When the optical disc of the invention is reproduced in a low-density optical disc reproducing apparatus, the information of said second recording layer 260 on which low-density recording is made, is reproduced without any problem.

Also a high-density optical disc reproducing apparatus first regenerates information from the innermost part of the optical disc. An idea favorable for this reproducing sequence is put into the optical disc of the invention. In other words, it is favorable for building the reproducing sequence according to various programs, if it is found at starting reproduction that the high-density optical disc reproducing apparatus records, on the outer part, information recorded at a high-density. This point is explained, based on the ninth and tenth embodiments of the optical disc of the invention.

[Ninth Embodiment]

The ninth embodiment (unillustrated) of the invention is explained.

Contents information called TOC is recorded on the innermost part of a low-density optical disc like a CD. A CD player first reproduces said TOC information, checks the relation between program contents and a recorded location, and then reproduces necessary information. In view of this point, in the ninth embodiment of the invention, information showing high-density recording is made on the outer part, is recorded on the innermost part of the recording area of the second recording layer 260 in FIG. 9. This information is recorded e.g. on the subcode area of a CD signal. It is no problem, because a high-density optical disc reproducing apparatus can reproduce the low-density recording area on the inner part.

[Tenth Embodiment]

The tenth embodiment (unillustrated) of the invention is explained. The high-density recording area on the optical disc of the tenth embodiment, is provided on the innermost part as well as on said outer part. In other words, in FIG. 9, a high-density recording area is provided on the outer part area from said first recording layer 220 and on the inner side area from said second recording layer 220. Information showing there is high-density recorded information on the outer side, is recorded at a low density on the high-density recording area of said innermost part.

The high-density recording area on said innermost part is flush with the high-density recording area of said outer part (first recording layer 220 or third recording layer 320).

Still, the thicknesses of said first substrate 210 and second substrate 250 (250a) are not limited to 0.6 mm, and may be not always equal. For example, if higher density recording and reproduction become possible by advancing the development in a blue laser in the future, it is considered that the thickness of said first substrate 210 is 0.4 mm; that of said second substrate 250 (250a) is 0.6 mm. Also, when the same contents of information (program) is recorded on said low-density recording layer and high-density recording layer, optical disc manufacturers have the advantages of reducing the number of the kinds of optical discs, and of promoting unpopular high-density optical discs.

Field of Industrial Utilization

According to the invention, there is provided an information recording disc that can reproduce a first area on the inner side of the disc using a reproducing apparatus conventionally owned by users, and can reproduce a higher quality second area using the same disc as a new high-density disc reproducing apparatus purchased, which is a single inventory recording the same information of different qualities on the first and second areas so that two kinds of discs are not produced and stocked separately for increasing producing efficiency and for reducing distribution inventories to half, being extremely favorable for manufactures and sellers, and further being significant for users buying the discs.

Further according to the invention, when the same music source is recorded at a normal density (normal quality) and at a high density (high quality) in information recording, a first area on the inner side of a disc can be reproduced using a conventionally-owned reproducing apparatus for normal quality; and a second area outside the disc can be reproduced using a reproducing apparatus for high quality.

Yet according to the invention, a conventionally-owned reproducing apparatus (CD player) and a new high-density disc reproducing apparatus (high-density newly-formatted player), can first reproduce a readin area corresponding to each recording density, optimizing a signal read condition for each player.

Further according to the invention, since the contents of an information signal (i.e. readin signal recorded on readin area BI1) related to a first data of a second area is recorded on a third area, just as it is, the contents of the readin signal recorded on the second area can be simplified, increasing the recording space of the first data signal of the second area for this recording space simplified and reduced.

Still according to the invention, when the same music source is recorded on a disc at a normal density (normal quality) and at an ultrahigh density (ultrahigh quality) that is much higher than a high density (high quality), a conventionally-owned reproducing apparatus for normal quality can reproduce a first area on the inner side of the disc, just as it is; and a reproducing apparatus for ultrahigh quality, led by the information signal of a third area, can reproduce reliably a second area of the inner and outer sides of the disc.

Further according to the invention, since an optical disc on which a phase pit or groove is formed, providing: a signal recording surface being segmented into a first area and a second area in the radius direction, the recording density of the second area being 2 to 10 times that of the first area, pit depths of the first and second areas being the same, and mechanical and optical accuracies standards of the disc based on that the entire disc surface has the density of the second area being applied to all areas of the disc composed of the first area and the second area of the invention, the productivity of the information recording disc can be improved without deteriorating the total reproducing characteristic, by changing the signal characteristic standard of the first area of the disc of the invention, in comparison with the signal characteristic standard based on that the entire disc surface has the density of the first area.

Yet according to the invention, there is provided an information recording disc that can reproduce a first area on the inner side of the disc using a reproducing apparatus conventionally owned by users, and can reproduce a higher quality second area using the same disc as a new high-density disc reproducing apparatus purchased, wherein recording the same music source on the disc at a normal density (normal quality) and a high density (high quality), can reproduce the first area on the inner side of the disc using a conventionally-owned reproducing apparatus for normal quality, and the second area outside the disc using a regenerating apparatus for high quality.

Further according to the invention, a conventionally-owned reproducing apparatus (CD player) and a new high-density disc reproducing apparatus (high-density newly-formatted player), can first reproduce a readin area corresponding to each recording density, optimizing a signal read condition for each player.

Still according to the invention, since the contents of an information signal (i.e. readin signal recorded on readin area BI1) related to a first data of a second area is recorded on a third area, just as it is, the contents of the readin signal recorded on the second area can be simplified, increasing the recording space of the first data signal of the second area for this recording space simplified and reduced.

Further according to the invention, when the same music source is recorded on an information disc at a normal density (normal quality) and at an ultrahigh density (ultrahigh quality) that is much higher than a high density (high quality), a conventionally-owned reproducing apparatus for normal quality can reproduce a first area on the inner side of the disc, just as it is; and a reproducing apparatus for ultrahigh quality, led by the information signal of a third area, can reproduce reliably a second area of the inner and outer sides of the disc.

Yet according to the invention, the same information recording disc can be reproduced with a low-density optical disc reproducing apparatus and a high-density optical disc reproducing apparatus.

Further according to the invention, molding and producing an optical disc are easier than forming a plurality of recording layers on one substrate.

Still according to the invention, a high-density optical disc reproducing apparatus may first reproduce the innermost part like a low-density optical disc reproducing apparatus, facilitating reproducing control.

What is claimed is:

1. An information recording disc, comprising:
    a first signal recording area on which a first data is recorded;
    a second signal recording area, being a signal recording area outer from said first area in the radius direction, and wherein a second data is recorded at a density higher than that of said first data; and
    a third signal recording area, being a signal recording area inner from said first area in said radius direction, and wherein an information signal related to said second data is recorded at the same recording density as said second data; wherein a degree of signal modulation on said first area is 0.8 to 0.95 times that set when the entire of a signal recording surface formed by the first, second and third areas is recorded at the recording density of said first area.

2. The information recording disc of claim 1 wherein the recording density of said second data is 2 to 10 times that of said first data.

3. An information recording disc, comprising: a signal recording surface having a first signal recording area, and a second signal recording area, adjacent to said first signal recording area in the radius direction, a signal being recorded on said second signal recording area at a recording density 2 to 10 times that of said first signal recording area, and having the same signal recording groove depth as that of said first signal recording area; and wherein mechanical and optical accuracies set when said signal is recorded at the recording density of said second area, are applied to the entire of said signal recording surface; wherein a degree of signal modulation on said first area is 0.8 to 0.95 times that set when the entire of said signal recording surface is recorded at the recording density of said first area.

4. The information recording disc of claim 3 wherein said first area is formed on the inner side of said information recording disc in the radius direction, and said second area is formed on the outer side thereof in said radius direction.

5. The information recording disc of claim 4 wherein the inner side of said first area has an information recording area on which information related to said second area is recorded at the same recording density as said second area.

6. The information recording disc of claim 4 wherein the inner side of said first area has an information recording area on which information related to said first area and said second area is recorded at the same recording density as said first area.

7. The information recording disc of claim 3 wherein said first area is formed on the outer side of said information recording disc in the radius direction, and said second area is formed on the inner side thereof in said radius direction.

8. The information recording disc of claim 7 wherein the inner side of said second area has an information recording area on which information related to said first area and said second area is recorded at the same recording density as said first area.

9. An information recording disc wherein a first substrate and a second substrate on which a reproducing light is irradiated are bonded through a bonding layer, comprising:

a first recording area provided on said second substrate and in proximity to said bonding layer, and formed on the outer part of said information recording disc in the radius direction, formed with at least a convex and recessed shape pit or groove to record information therein, the pit or groove being covered with a reflective layer;

a second recording area provided on said first substrate and in proximity to the surface of said information recording disc, and formed on the inner part of said information recording disc in the radius direction, formed with at least a convex and recessed shape pit or groove to record information therein at a density lower than that for said first recording area, the pit or groove being covered with a reflective layer;

a third recording area, in proximity to said bonding layer of said first substrate, formed on the location opposite to said first recording area, and wherein information is recorded at a density higher than that of said second recording area; and a first reflective layer, formed between said first recording area and said bonding layer, and reflecting said reproducing light, and a reflective rate, formed between said third recording area and said bonding layer, and being the same as that of said first reflective layer or more.

10. The information recording disc of claim 9 wherein said first recording area is provided on said bonding layer side of said first substrate, and said second recording area is provided opposite to said bonding layer of said first substrate.

11. The information recording disc of claim 9 wherein information showing that information is recorded on said first recording area at a density higher than that of said second recording area, is recorded on the inner part from said second recording area of said information recording disc in the radius direction.

\* \* \* \* \*